United States Patent
Hu et al.

(10) Patent No.: US 11,836,382 B2
(45) Date of Patent: Dec. 5, 2023

(54) DATA READ METHOD, DATA STORAGE METHOD, ELECTRONIC DEVICE, AND COMPUTER PROGRAM PRODUCT

(71) Applicant: EMC IP Holding Company LLC, Hopkinton, MA (US)

(72) Inventors: Chenxi Hu, Beijing (CN); Sanping Li, Beijing (CN); Zhen Jia, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 9 days.

(21) Appl. No.: 17/532,564

(22) Filed: Nov. 22, 2021

(65) Prior Publication Data

US 2023/0127430 A1 Apr. 27, 2023

(30) Foreign Application Priority Data

Oct. 22, 2021 (CN) .......................... 202111251576.1

(51) Int. Cl.
*G06F 3/06* (2006.01)

(52) U.S. Cl.
CPC .......... *G06F 3/0659* (2013.01); *G06F 3/0604* (2013.01); *G06F 3/067* (2013.01); *G06F 3/0646* (2013.01)

(58) Field of Classification Search
None
See application file for complete search history.

(56) References Cited

U.S. PATENT DOCUMENTS 7,652,982 B1 * 1/2010 Kovummal ........... H04L 49/552
370/216
9,880,750 B1 * 1/2018 Ravindran ............. G06F 13/00
(Continued)

FOREIGN PATENT DOCUMENTS

CN 106797351 A * 5/2017 ............ H04L 45/42

OTHER PUBLICATIONS

Wikipedia, "Named Data Networking," https://en.wikipedia.org/wiki/Named_data_networking, May 26, 2021, 12 pages.
(Continued)

*Primary Examiner* — Brian R Peugh
(74) *Attorney, Agent, or Firm* — Ryan, Mason & Lewis, LLP

(57) ABSTRACT

Embodiments of the present disclosure relate to a data read method, a data storage method, an electronic device, and a computer program product. The data read method includes: receiving a data read request, the data read request comprising a data identifier associated with target data; determining a storage device of the target data based on the data identifier; and acquiring the target data from the storage device based on the data identifier. The data storage method includes: receiving a data storage request, the data storage request comprising a data identifier associated with data to be stored; determining, based on the data identifier, a target storage device for the data to be stored; and storing, based on the data identifier, the data to be stored to the target storage device. With the technical solutions of the present disclosure, a named data network with good performance and efficient operation can be achieved.

20 Claims, 6 Drawing Sheets

(56) References Cited

U.S. PATENT DOCUMENTS

| | | | | |
|---|---|---|---|---|
| 2015/0117253 | A1* | 4/2015 | Scott | H04L 45/34 370/254 |
| 2017/0322747 | A1* | 11/2017 | Kumano | G06F 3/0608 |
| 2020/0225868 | A1* | 7/2020 | Dalmatov | G06F 12/0873 |
| 2021/0109677 | A1* | 4/2021 | Das | G06F 3/0679 |
| 2021/0263664 | A1* | 8/2021 | Glimcher | G06F 3/0644 |

OTHER PUBLICATIONS

Intel Corporation, "Intel Programmable Ethernet Switch Products," https://www.intel.com/content/www/US/en/products/network-io/programmable-ethernet-switch.html, Accessed Feb. 24, 2021, 5 pages.

* cited by examiner

DATA READ METHOD, DATA STORAGE METHOD, ELECTRONIC DEVICE, AND COMPUTER PROGRAM PRODUCT

RELATED APPLICATION (S)

The present application claims priority to Chinese Patent Application No. 202111251576.1, filed Oct. 22, 2021, and entitled "Data Read Method, Data Storage Method, Electronic Device, and Computer Program Product," which is incorporated by reference herein in its entirety.

FIELD

Embodiments of the present disclosure relate generally to computer technologies, and specifically to a data read method, a data storage method, an electronic device, and a computer program product that can be used in data networks, in particular, in named data networks.

BACKGROUND

Named data networking is an important technology that is particularly applicable to distributed edge network applications. Specifically, named data networking is related to content-centric networks (CCNs), content-based networks, data-oriented networks, or information-centric networks (ICNs), and is a proposed future Internet architecture. During the use of networks of contemporary Internet architectures such as the Internet protocol, named data networks were created when unresolved issues in network use were gradually realized. Named data networks were based on CCNs in early projects. It is widely recognized in the related fields today that this simple conceptual transformation will have a profound impact on the way people design, develop, deploy, and use networks and applications. In named data networks, main constituent blocks are named content data blocks, which are in contrast with the basic units in Internet protocol communications. In Internet protocol communications, communication may be an end-to-end channel between two endpoints identified by an Internet protocol address.

However, there is currently no implementation of a named data network with good performance and efficient operation in the industry.

SUMMARY

Embodiments of the present disclosure provide a data read method, a data storage method, an electronic device, and a computer program product.

In a first aspect of the present disclosure, a data read method is provided. This method includes: receiving a data read request, the data read request comprising a data identifier associated with target data; determining a storage device of the target data based on the data identifier; and acquiring the target data from the storage device based on the data identifier.

In a second aspect of the present disclosure, a data storage method is provided. This method includes: receiving a data storage request, the data storage request comprising a data identifier associated with data to be stored; determining, based on the data identifier, a target storage device for the data to be stored; and storing, based on the data identifier, the data to be stored to the target storage device.

In a third aspect of the present disclosure, an electronic device is provided. The electronic device includes: at least one processing unit; at least one memory coupled to the at least one processing unit and storing instructions for execution by the at least one processing unit, wherein the instructions, when executed by the at least one processing unit, cause the device to perform actions comprising: receiving a data read request, the data read request comprising a data identifier associated with target data; determining a storage device of the target data based on the data identifier; and acquiring the target data from the storage device based on the data identifier.

In a fourth aspect of the present disclosure, an electronic device is provided. The electronic device includes: at least one processing unit; at least one memory coupled to the at least one processing unit and storing instructions for execution by the at least one processing unit, wherein the instructions, when executed by the at least one processing unit, cause the device to perform actions comprising: receiving a data storage request, the data storage request comprising a data identifier associated with data to be stored; determining, based on the data identifier, a target storage device for the data to be stored; and storing, based on the data identifier, the data to be stored to the target storage device.

In a fifth aspect of the present disclosure, a computer program product is provided. The computer program product is tangibly stored on a non-transitory computer-readable medium and includes machine-executable instructions, wherein the machine-executable instructions, when executed, cause a machine to perform any step of the method described according to the first aspect of the present disclosure.

In a sixth aspect of the present disclosure, a computer program product is provided. The computer program product is tangibly stored on a non-transitory computer-readable medium and includes machine-executable instructions, wherein the machine-executable instructions, when executed, cause a machine to perform any step of the method described according to the first aspect of the present disclosure.

This Summary is provided to introduce the selection of concepts in a simplified form, which will be further described in the Detailed Description below. The Summary is neither intended to identify key features or essential features of the embodiments of the present disclosure, nor intended to limit the scope of the embodiments of the present disclosure.

BRIEF DESCRIPTION OF THE DRAWINGS

The above and other objectives, features, and advantages of the present disclosure will become more apparent from the following description of example embodiments of the present disclosure, in combination with the accompanying drawings. In the example embodiments of the present disclosure, the same reference numerals generally represent the same parts.

Identical or corresponding numerals represent identical or corresponding parts in various accompanying drawings.

DETAILED DESCRIPTION

Figure 1:
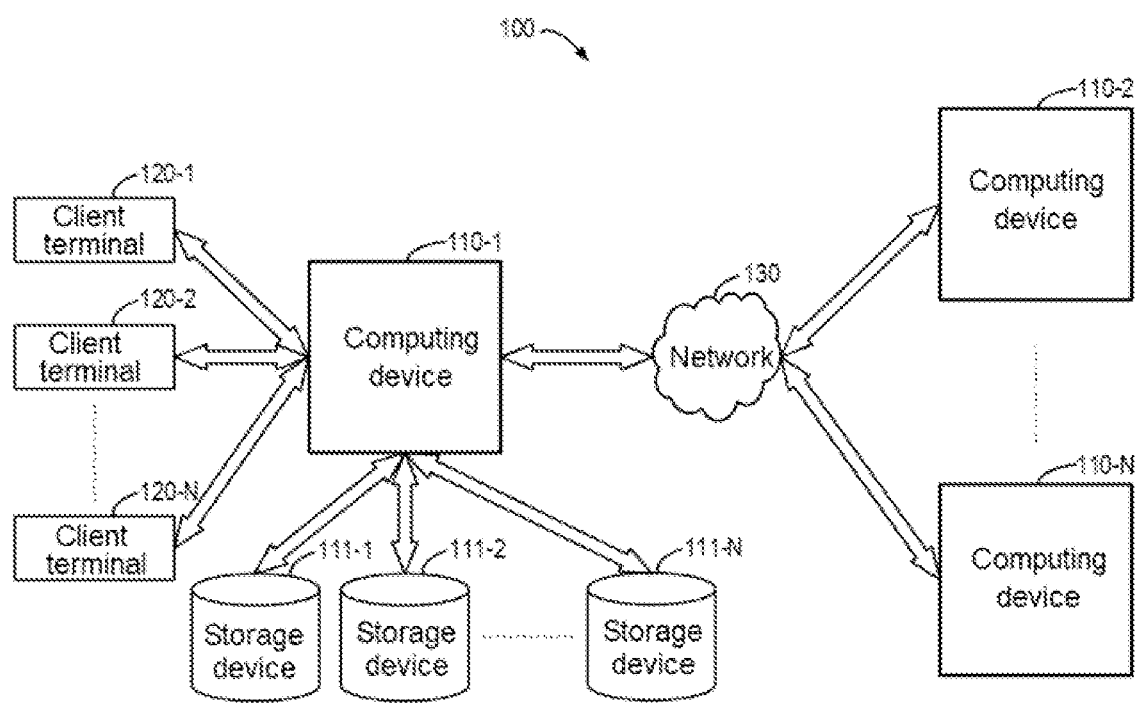
FIG. 1 illustrates a schematic diagram of a named data network in which devices and/or methods according to embodiments of the present disclosure may be implemented.

Example embodiments of the present disclosure will be described in more detail below with reference to the accompanying drawings. Although example embodiments of the present disclosure are shown in the accompanying drawings, it should be understood that the present disclosure may be implemented in various forms and should not be limited by the embodiments set forth herein. Rather, these embodiments are provided to make the present disclosure more thorough and complete and to fully convey the scope of the present disclosure to those skilled in the art.

As used herein, the term "include" and variations thereof mean open-ended inclusion, for example, "including but not limited to." Unless specifically stated, the term "or" means "and/or." The term "based on" means "based at least in part on." The terms "an example embodiment" and "an embodiment" mean "at least one embodiment." The term "another embodiment" indicates "at least one additional embodiment." The terms "first," "second," and the like may refer to different or identical objects. Other explicit and implicit definitions may also be included below.

As described above in the Background section, there is no implementation of a named data network with good performance and efficient operation in the industry. Specifically, in Internet protocol-based architectures, edge computing client terminal applications rely on centralized entities such as agents and/or controllers of software defined networks, or communicate directly with all edge computing devices in order to make wise task offload decisions. However, these solutions require the creation of additional infrastructure in a network, which introduces overhead requests that are routed to agents or controllers, and all information from computing resources is also routed to these entities. Thus, links to these entities become bottlenecks. The network only operates as a forwarder, where all choices are made at the application level and especially using agents.

In addition, the content distribution of the named data network encounters limitations in the deployment of the named data network because, although the named data network is intended to replace the Internet protocol network, the named data network protocol is not 100% compatible with the Internet protocol network protocol. Further, the named data network is based on the distribution of named content and therefore requires a large amount of computing and storage resources to process and cache the content, where not only the caching of the content consumes a large amount of storage space, but searching for names and routing packets will also use a large amount of computing resources. In addition, current named data network gateway or router solutions are based on central processing unit infrastructure, thus resulting in inefficiencies. This is because dedicated hardware for named data networks is currently unavailable due to incompatibility with Internet protocol networks, test networks of most named data networks are built on servers for functional development, and most existing implementations are software-based, which limits their performance.

To at least partially address one or more of the above issues and other potential problems, embodiments of the present disclosure provide a framework that enables accelerated content distribution in named data networks and supports load balancing and replication. This framework can work in a native cluster to build distributed storage. In addition, it can help build and accelerate overlaying named data networks on Internet networks to provide distributed content delivery services for named data networks. To achieve this goal, embodiments of the present disclosure provide a pipeline framework utilizing programmable switches, wherein the switches are deployed to connect Internet of Things (IoT) devices or distributed storage in edge networks and storage servers in data center networks. With respect to programmable switches, embodiments of the present disclosure provide novel methods to enable hashing algorithms to perform in-network hash computations, such as SHA1, SHA2, and SHA3 algorithms that can be supported to run on programmable switches. In addition, by utilizing consistent hashing, embodiments of the present disclosure build routing tables on programmable switches to help routing named data network packets to corresponding data storage devices. By introducing Advanced Encryption Standard (AES) algorithms on programmable switches, embodiments of the present disclosure also support secure named data network gateways. In addition, embodiments of the present disclosure can establish accelerated named data network virtual private networks (VPNs) based on the framework.

In embodiments of the present disclosure, the forwarding behaviors of named data network routers are involved. When receiving a packet of a request or data that may be referred to as an "interest," the first step is to extract the name or identifier of the packet. Afterwards, if the packet is an interest, the named data network router checks a content repository against the named content. If a local copy is available, the data is forwarded directly downstream. Otherwise, the router looks up a pending interest table (PIT) to find out if there are any pending interests for the same content. If a PIT entry already exists, the entry is updated and the interest is deleted. If not, a PIT entry is created, and the named data network router looks up a forwarding information base (FIB) to determine the next hop of the received interest. Upon receipt of the packet, the named data network router looks up the PIT to check if the data is solicited, and if no PIT entry exists for that name, the data is considered unsolicited and is therefore discarded. Otherwise, if a PIT entry exists, the packet is multiplexed to all listed interfaces. The named data network router may also decide to cache copies of the data, depending on its caching policy. Typical ways to handle unanswered interests, for example, when a PIT is full or a packet is lost due to expiration of an entry, include re-publishing the requesting consumer.

FIG. 1 illustrates a schematic block diagram of named data network 100 in which the data read method and data write method of some embodiments of the present disclosure may be implemented. According to an embodiment of the present disclosure, named data network 100 may be a cloud environment.

As shown in FIG. 1, named data network 100 includes a plurality of computing devices 110-1, 110-2, . . . , and 110-N (hereinafter referred to collectively as computing devices 110), a plurality of client terminals 120-1, 120-2, . . . , and 120-N (hereinafter referred to collectively as client terminals 120), and network 130. Computing device 110-1 is associated with a plurality of storage devices 111-1, 111-2, . . . , and 111-N (hereinafter referred to collectively as storage devices 111), and may include a cache not shown. According to an embodiment of the present disclosure, storage devices 111 are local with respect to computing device 110-1 and may be provided inside computing device 110-1. Computing device 110-2 and computing device 110-N also have connected client terminals and associated storage devices that are not shown in FIG. 1 for the sake of brevity.

Client terminals 120 are used by a user to store data and read data in named data network 100. In named data network 100, data may be stored in storage devices 111 linked to computing devices 110, or may be stored in the cache that computing devices 110 have. Computing devices 110 are connected to each other using network 130. According to an embodiment of the present disclosure, network 130 may include any form of network connection such as a virtual private network or an Internet protocol secure (IPSec) connection, and the scope of protection of the present disclosure is not limited in this respect.

According to an embodiment of the present disclosure, computing devices 110 may be routers in the named data network, which may be implemented, for example, by programmable switches, wherein the programmable switches may include programmable parsers, programmable match action pipelines, and programmable inverse deparsers. The programmable switches may, for example, operate at a rate of 12.8 TB/s, may support the 400GE interface, may fully support the P4 language, and may operate at a line rate with flexible programmability, thereby providing performance and programmability at the same time.

According to an embodiment of the present disclosure, client terminals 120 may include IoT devices, such as air conditioner controllers, smart locks, traffic lights, webcams, etc., which are connected to edge switches. The framework defined in accordance with embodiments of the present disclosure may be used to utilize programmable switches for edge switches between IoT devices and clouds or servers.

Unlike conventional switches, programmable switches can be flexibly reprogrammed to have new features and functions that are not limited to network-related functions. The programs in programmable switches may be written in the P4 language and may be updated online. Using the framework according to the embodiments of the present disclosure, it is possible to provide functionality that enables virtual private networks for named data networks to support distributed content operations in named data networks, which also helps accelerate named data network protocols with built-in functionality on programmable switches.

By leveraging the benefits of programmable switches, the aforementioned named data network gateway can be implemented. Edge IoT devices may utilize the named data network protocol to connect to the named data network in the data center via a virtual private network with hardware acceleration and replication capabilities.

According to an embodiment of the present disclosure, the computation of AES encryption and decryption algorithms on a programmable switch can be successfully implemented by leveraging the programmability of the programmable switch. By enabling the AES algorithm, the components of an IPSec gateway can be used, and a virtual private network can be established between the named data network gateways on the programmable switch. Internet protocol security protocols may be used to encapsulate named data network packets.

According to an embodiment of the present disclosure, through the use of consistent hashing algorithms, reading or storage requests for data can be distributed to different storage devices 111 for higher performance. The number of copies of data that can be saved for the same copy of data can be defined in named data network 100, allowing for redundancy and load balancing.

According to an embodiment of the present disclosure, an example load balancing design implemented in computing devices 110 acting as named data network routers is illustrated as follows: there are n storage devices 111 connected to computing device 110, where each storage device 111 sends a joint request with its medium access control (MAC), computing device 110 calculates a key Node_Key=Hash (MAC) $[0\sim2^m)$ of the storage device 111, computing device 110 stores the key Node_key of the storage device 111 in its hash ring table, client terminal 120 uses the data name to request data, computing device 110 calculates a name key Name_Key=Hash (Name) $[0\sim2^m)$, computing device 110 looks up storage device 111 of which the key range covers the name key Name_Key, computing device 110 sends a request to storage device 111 using the name key Name_Key, storage device 111 uses the name key Name_Key to find data and uses the data to respond to computing device 110, and computing device 110 sends the data to client terminal 120.

According to an embodiment of the present disclosure, a hash ring table of 6 storage devices 111 is used as an example, where $N_n$ is the storage device key Node_Key of storage device n. If the number of copies is 2, the key range may be that: storage device 1 stores data of the key Key [N1~N3), storage device 2 stores data of the key Key [N2~N4), storage device 3 stores data of the key Key [N3~N5), storage device 4 stores data of the key Key [N4~N6), storage device 5 stores data of the key Key [N5~N1), and storage device 6 stores data of the key Key [N6~N2).

When a new storage device joins the named data network by connecting to the named data network router, the named data network router calculates the hash (storage device MAC) and broadcasts it to the named data network routers in the router table. Each named data network router receives the broadcasted storage device connection and then updates its routing table by inserting information about the storage device.

When it is detected that a storage device leaves the named data network by disconnecting from the named data network router, the named data network router broadcasts the storage device of the storage device to the named data network routers in the routing table. Each named data network router receives the broadcasted storage device leaving packet and then updates its routing table by removing the information about the storage device.

Figure 2:
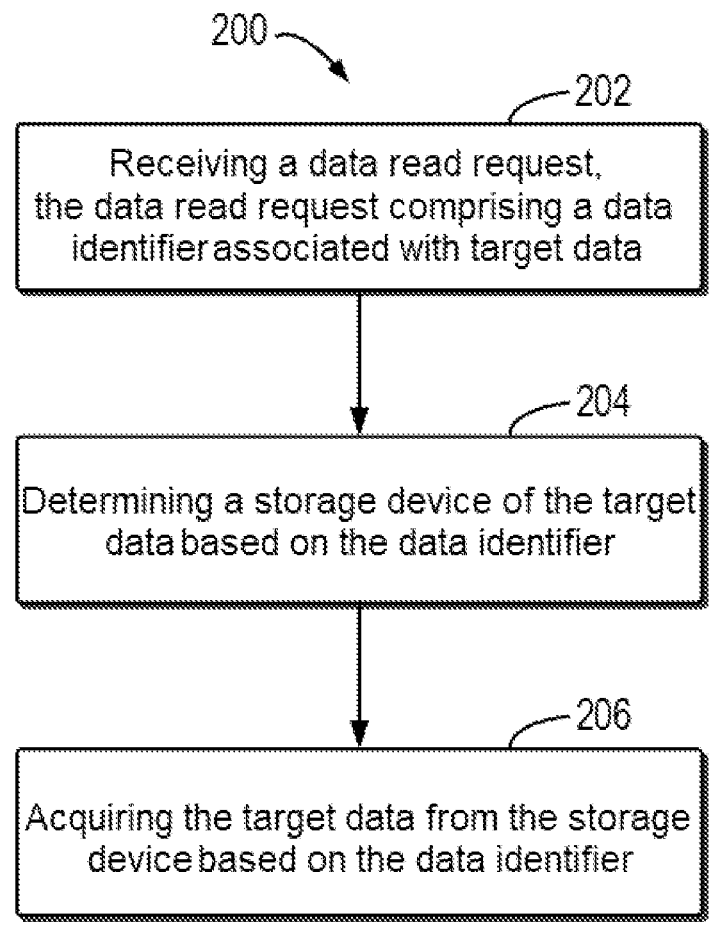
FIG. 2 illustrates a flow chart of a data read method according to an embodiment of the present disclosure.

FIG. 2 illustrates a flow chart of data read method 200 according to an embodiment of the present disclosure. Method 200 may be implemented by computing device 110 shown in FIG. 1, or by other appropriate devices. It should be understood that data read method 200 may also include additional steps not shown and/or may omit the steps shown, and the scope of the embodiments of the present disclosure is not limited in this regard.

At block 202, computing device 110 receives a data read request from client terminal 120. According to an embodiment of the present disclosure, the data read request includes a data identifier associated with target data, and the data identifier may include the name of the target data or a hash value associated with the target data, for example, a hash value associated with the name of the target data.

At block 204, computing device 110 determines a storage device of the target data based on the data identifier in the data read request received at block 202. According to an embodiment of the present disclosure, the storage device may be a cache of the computing device receiving the data read request, a storage device associated with the computing device receiving the data read request, or a cache or storage device associated with another computing device that may be connected via network 130 to the computing device receiving the data read request and belongs to the same named data network 100.

At block 206, computing device 110 acquires the target data from the storage device based on the data identifier. According to some embodiments of the present disclosure, when computing device 110 determines at block 204 that the storage device of the target data is a cache of computing device 110 and is a storage device associated with the computing device receiving the data read request, the target device may be acquired directly from the storage device. According to some other embodiments of the present disclosure, when computing device 110 determines at block 204 that the storage device of the target data is a storage device associated with another computing device that may be connected via network 130 to the computing device receiving the data read request and belongs to the same named data network 100, computing device 110 may send a data read request to this other computing device acting as a remote computing device and then acquire the target data from this remote computing device. Computing device 110 may then send the acquired target data to client terminal 120 that has sent the corresponding data read request.

Figure 3:
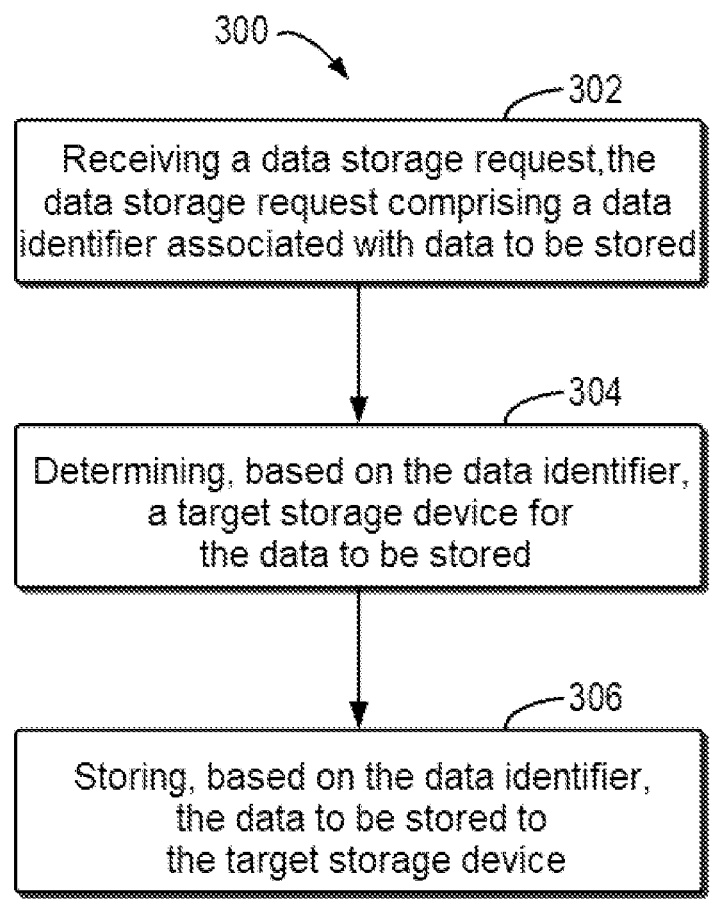
FIG. 3 illustrates a flow chart of a data storage method according to an embodiment of the present disclosure.

FIG. 3 illustrates a flow chart of data storage method 300 according to an embodiment of the present disclosure. Method 300 may be implemented by computing device 110 shown in FIG. 1, or by other appropriate devices. It should be understood that data storage method 300 may also include additional steps not shown and/or may omit the steps shown, and the scope of the embodiments of the present disclosure is not limited in this regard.

At block 302, computing device 110 receives a data storage request from client terminal 120. According to an embodiment of the present disclosure, the data storage request includes a data identifier associated with data to be stored, and the data identifier may include the name of the data to be stored or a hash value associated with the data to be stored, for example, a hash value associated with the name of the target data.

At block 304, computing device 110 determines, based on the data identifier, a target storage device for the data to be stored. According to an embodiment of the present disclosure, the target storage device may be a storage device associated with the computing device receiving the data storage request, or a storage device associated with another computing device that may be connected via network 130 to the computing device receiving the data storage request and belongs to the same named data network 100.

At block 306, computing device 110 stores, based on the data identifier, the data to be stored to the target storage device. According to some embodiments of the present disclosure, when the target storage device is a storage device associated with the computing device receiving the data storage request, computing device 110 may store the data to be stored directly to the target storage device.

According to some other embodiments of the present disclosure, when the target storage device is a storage device associated with another computing device that may be connected via network 130 to the computing device receiving the data storage request and belongs to the same named data network 100, computing device 110 may send a data storage request to this other computing device acting as a remote computing device and later receive from the remote computing device a data read request for the data to be stored, wherein the data read request includes the data identifier. Finally, computing device 110 may send the data to be stored to the remote computing device in response to the data read request. In some embodiments, computing device 110 may also receive a storage success indication from the remote computing device.

Figure 4:
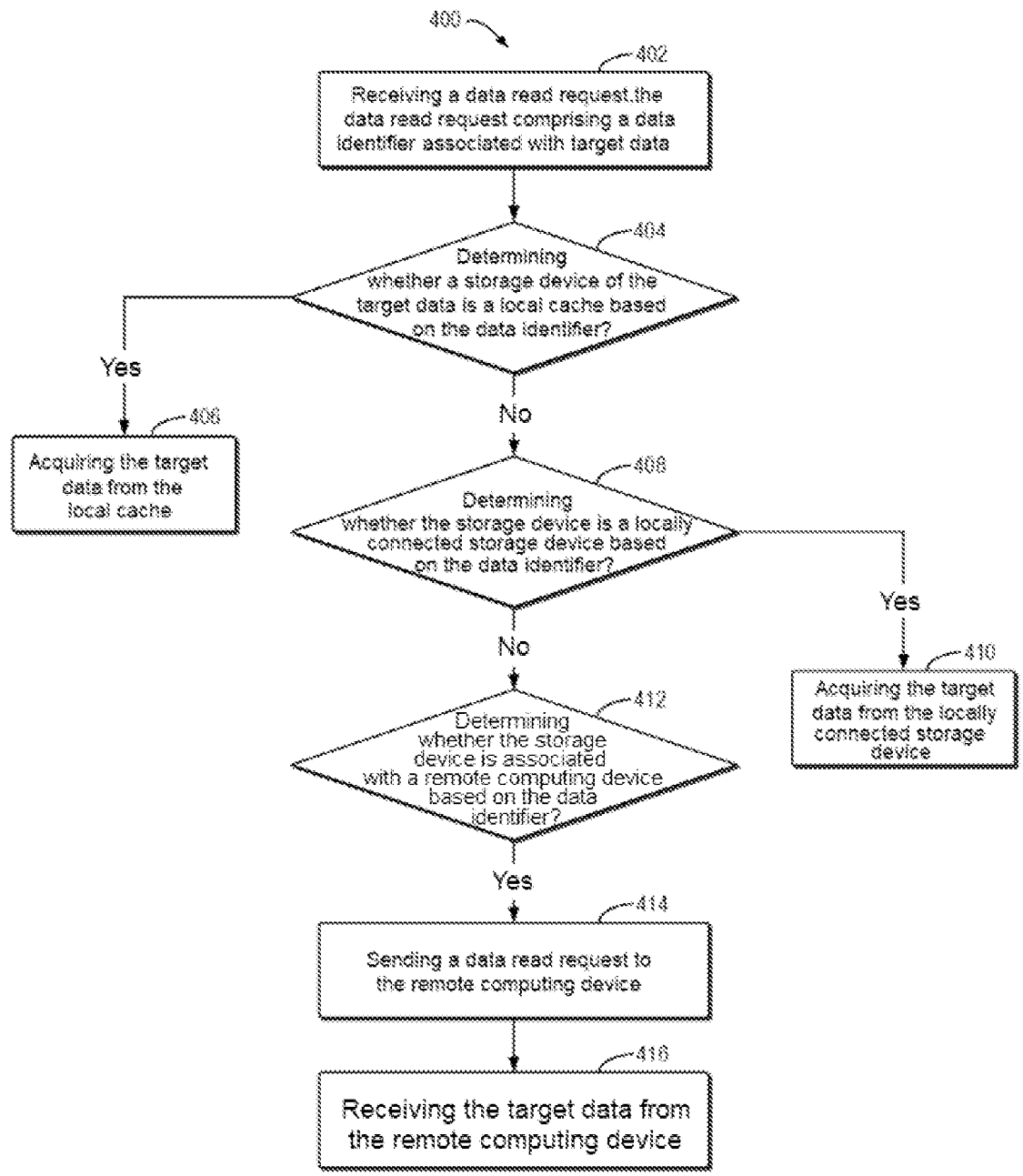
FIG. 4 illustrates a flow chart of a data read method according to an embodiment of the present disclosure.

FIG. 4 illustrates a flow chart of data read method 400 according to an embodiment of the present disclosure. Method 400 may be implemented by computing device 110 shown in FIG. 1, or by other appropriate devices. It should be understood that data read method 400 may also include additional steps not shown and/or may omit the steps shown, and the scope of the embodiments of the present disclosure is not limited in this regard.

At block 402, computing device 110 receives a data read request from client terminal 120. The content involved in block 402 is the same as that involved in block 202, and will not be repeated here.

At block 404, computing device 110 determines whether the storage device of the target data is a local cache based on the data identifier. If the storage device of the target data is a local cache, method 400 proceeds to block 406; otherwise, method 400 proceeds to block 408.

At block 406, computing device 110 acquires the target data from the local cache.

At block 408, computing device 110 determines whether the storage device of the target data is a locally connected storage device based on the data identifier. If the storage device of the target data is a locally connected storage device, method 400 proceeds to block 410; otherwise, method 400 proceeds to block 412.

At block 410, computing device 110 acquires the target data from the locally connected storage device.

At block 412, computing device 110 determines whether the storage device of the target data is associated with a remote computing device based on the data identifier. If the storage device of the target data is associated with a remote computing device, method 400 proceeds to block 414; otherwise, method 400 may report an error and exit, or return an indication that the data could not be read.

At block 414, computing device 110 sends a data read request to the remote computing device.

At block 416, computing device 110 receives the target data from the remote computing device.

Figure 5:
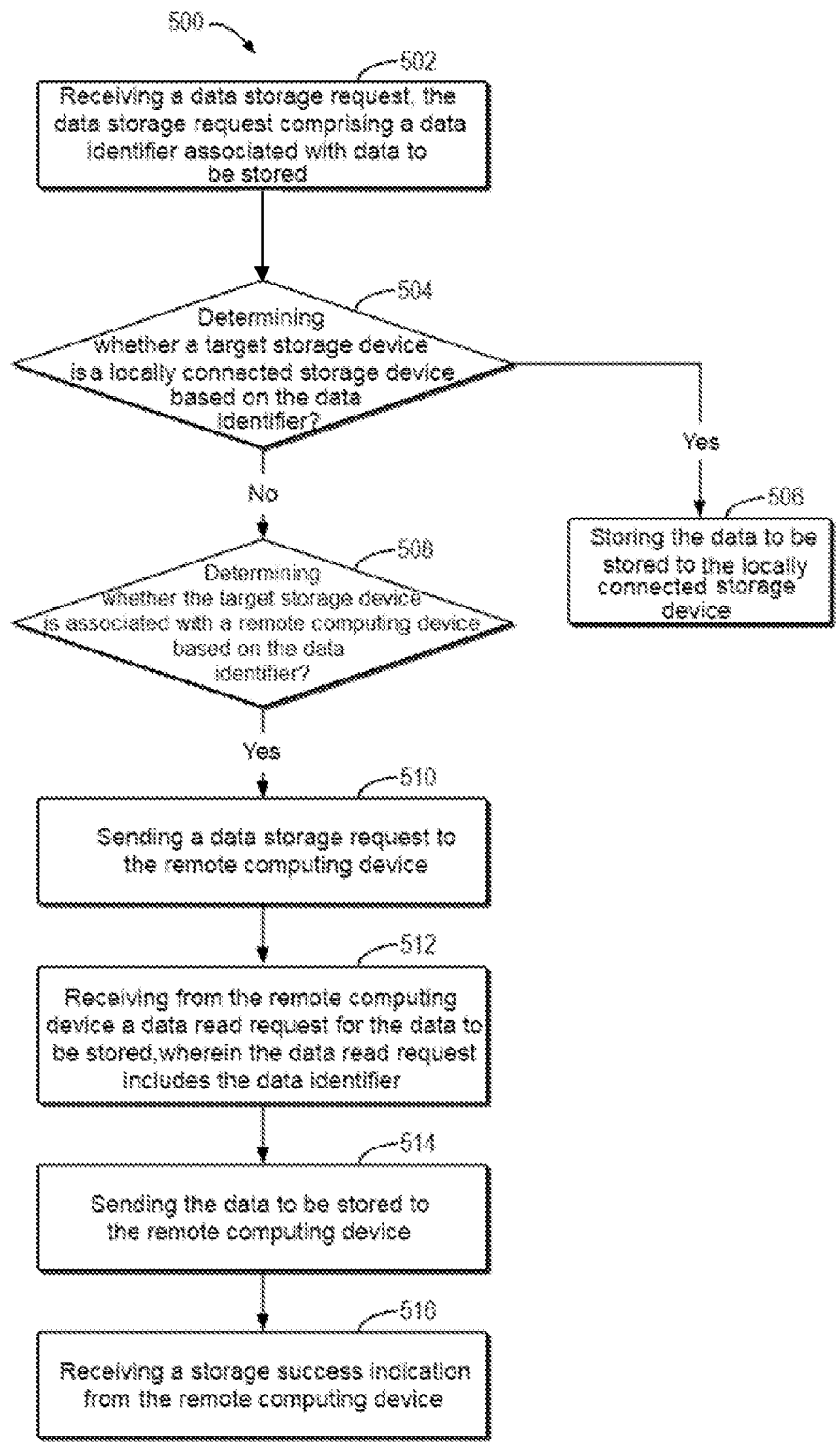
FIG. 5 illustrates a flow chart of a data storage method according to an embodiment of the present disclosure.

FIG. 5 illustrates a flow chart of data storage method 500 according to an embodiment of the present disclosure. Method 500 may be implemented by computing device 110 shown in FIG. 1, or by other appropriate devices. It should be understood that data storage method 500 may also include additional steps not shown and/or may omit the steps shown, and the scope of the embodiments of the present disclosure is not limited in this regard.

At block 502, computing device 110 receives a data storage request from client terminal 120. The content involved in block 502 is the same as that involved in block 302, and will not be repeated here.

At block 504, computing device 110 determines whether the target storage device is a locally connected storage device based on the data identifier. If the target storage device is a locally connected storage device, method 500 proceeds to block 506; otherwise, method 500 proceeds to block 508.

At block 506, computing device 110 stores the data to be stored to the locally connected storage device.

At block 508, computing device 110 determines whether the target storage device is associated with a remote computing device based on the data identifier. If the target storage device is associated with a remote computing device, method 500 proceeds to block 510; otherwise, method 500 may report an error and exit, or return an indication that the data could not be stored.

At block 510, computing device 110 sends a data storage request to the remote computing device.

At block 512, computing device 110 receives from the remote computing device a data read request for the data to be stored, wherein the data read request includes the data identifier.

At block 514, computing device 110 sends the data to be stored to the remote computing device in response to the data read request.

At block 516, computing device 110 receives a storage success indication from the remote computing device.

The data read and data storage processes in a named data network according to embodiments of the present disclosure are illustrated below with a specific example.

In a defined named data network, target Internet protocol addresses of routers of the named data network are stored in a routing table, which contains <key, value>. The key is a hash (a storage device MAC) and the value is the route of the storage device. The routing table is independent of the FIB of the routers of the named data network. The keys are stored in a search tree, which makes it easy to find storage devices that store data based on consistent hashing. Alternatively, the client terminal may send an interest packet of name or hash (name) to the named data network router. The named data network router is able to compute the hash (name).

Assume that the network has router 1, router 2, and router 3, where router 2 is connected with storage device 1 and storage device 2, router 3 is connected with storage device 3 and storage device 4, and client terminal 1 is directly connected to router 1.

When handling a data read request from client terminal 1, client terminal 1 sends an interest packet to the hash (name) and metadata (type_read_request); named data network router 1 searches for the hash (name) in its cache; if it is found in the cache, named data network router 1 directly responds by sending a data packet to client terminal 1; if it is not found in the cache of named data network router 1, a search is performed in its FIB to determine where to route the interest packet; if the target router is found to be named data network router 3, named data network router 1 encapsulates the interest packet and sends it to named data network router 3 via IPSec VPN; named data network router 1 places the hash (name) into its PIT; named data network router 3 unencapsulates the interest packet and searches in its cache; if it is found in the cache, named data network router 3 directly responds by sending a data packet to named data network router 1; if it is not found in the cache of named data network router 3, a search is performed in its FIB to determine where to route the interest packet; and if the target is found to be storage device 4, named data network router 3 sends the interest packet to storage device 4 and places the hash (name) into its PIT.

Correspondingly, the read response from storage device 4 is illustrated as follows: storage device 4 sends a data packet to the hash (name), metadata read response (type_read_respond); named data network router 3 places the data packet into its cache and searches for the hash (name) in its PIT; if the target router is found to be named data network router 1, named data network router 3 encapsulates the data packet and sends it to named data network router 1 via IPSec VPN; named data network router 1 unencapsulates the data packet, places the data packet into its cache, and searches for the hash (name) in its PIT; if the target is found to be client terminal 1, named data network router 1 sends the data packet to client terminal 1.

When handling a data write request from client terminal 1, client terminal 1 sends an interest packet to the hash (name) and metadata (type_write_request) to indicate a write operation; named data network router 1 searches for the hash (name) in its cache. If it is found in the cache, named data network router 1 directly responds by sending a data packet to client terminal 1; if it is not found in the cache of named data network router 1, a search is performed in its FIB to determine where to route the interest packet; if the target router is found to be named data network router 3, named data network router 1 encapsulates the interest packet and sends it to named data network router 3 via IPSec VPN; named data network router 3 unencapsulates the interest packet and searches in its cache; if it is found in the cache, named data network router 3 directly responds by sending a data packet to named data network router 1; if it is not found in the cache of named data network router 3, a search is performed in its FIB to determine where to route the interest packet; and if the target is found to be storage device 4, named data network router 3 sends the interest packet to storage device 4.

At this point, the corresponding data read request flow from storage device 4 is as follows: when storage device 4 receives an interest packet with metadata (type_write_request), storage device 4 will send the interest packet using the hash (name) and metadata (type_read_request); named data network router 3 searches for the hash (name) in its cache; if it is found in the cache, named data network router 3 directly responds by sending a data packet to storage device 4; if it is not found in the cache of named data network router 3, a search is performed in its FIB to determine where to route the interest packet; if the target router is found to be named data network router 1, named data network router 3 encapsulates the interest packet and sends it to named data network router 1 via IPSec VPN; named data network router 3 places the hash (name) into its PIT; named data network router 1 unencapsulates the interest packet and searches in its cache; if it is found in the cache, named data network router 1 directly responds by sending a data packet to named data network router 3; if it is not found in the cache of named data network router 1, a search is performed in its FIB to determine where to route the interest packet; and if the target is found to be client terminal 1, named data network router 1 sends the interest packet to client terminal 1 and places the hash (name) into its PIT.

At this point, a response to the read is sent from client terminal 1: client terminal 1 sends a data packet to the hash (name), metadata read response (type_read_respond); named data network router 1 places the data packet into its cache and searches for the hash (name) in its PIT; if the target router is found to be named data network router 3, named data network router 1 encapsulates the data packet and sends it to named data network router 3 via IPSec VPN; named data network router 3 unencapsulates the data packet, places the data packet into its cache, and searches for the hash (name) in its PIT; and if the target is found to be storage device 4, named data network router 3 sends the data packet to storage device 4.

Finally, a write success response may be sent from storage device 4 to client terminal 1, if desired: storage device 4 sends an interest packet using the hash (name) and metadata (type_write_success), which indicates that the write operation is successful; named data network router 3 searches for it in its FIB to determine where to route the interest packet; if the target router is found to be named data network router 1, named data network router 3 encapsulates the interest packet and sends it to named data network router 1 via IPSec VPN; named data network router 1 unencapsulates the interest packet and searches for it in its routing table to determine where to route the interest packet; and if the target is found to be client terminal 1, named data network router 1 sends the interest packet to client terminal 1.

The related content of named data network 100 in which the devices and/or the methods according to embodiments of the present disclosure may be implemented, data read method 200 according to an embodiment of the present disclosure, data storage method 300 according to an embodiment of the present disclosure, data read method 400 according to an embodiment of the present disclosure, and data storage method 500 according to an embodiment of the present disclosure are described above with reference to FIGS. 1 to 5. It should be understood that the above description is to better demonstrate the content recorded in the embodiments of the present disclosure, and is not intended to limit the present disclosure in any way.

It should be understood that the numbers of various elements and the magnitudes of physical quantities used in the embodiments of the present disclosure and the drawings are only examples, and are not intended to limit the protection scope of the embodiments of the present disclosure. The above numbers and magnitudes may be arbitrarily set as needed without affecting the normal implementation of the embodiments of the present disclosure.

Through the above description with reference to FIGS. 1 to 5, according to the technical solutions of the embodiments of the present disclosure, the disclosed framework can not only enrich the in-network computing for more efficient named data network functions, but also reduce the computing resource usage of edge devices, edge servers, and clouds. In addition, in order to support named data network gateways on switches, named data network latency can be reduced in the first place, which further improves the applicability of named data network protocols. With the enhanced security framework working on programmable switches, a secure distributed content delivery system can be easily established in named data networks.

In addition, the innovative framework of named data network gateways running on programmable switches is a fine alternative to current software-based solutions. By leveraging the P4 language, an efficient named data network gateway runs successfully on a programmable switch. At the same time, by providing Internet protocol security features, it is possible to overlay the named data network on the Internet protocol network.

Again, by utilizing a consistent hashing approach, the named data network in the form of a load balancing system is constructed with flexibility and redundancy. The load balancing function and replica support are successfully accomplished through innovative placement of the hash results of the storage device medium access control and the names of named data network packets in the consistent hash ring.

Finally, by redesigning the read and write operation processes on the named data network overlay network, the distributed named data network can be fully operational in the industry without involving support from backbone networks. In this way, edge IoT devices can easily use powerful named data networks.

Figure 6:
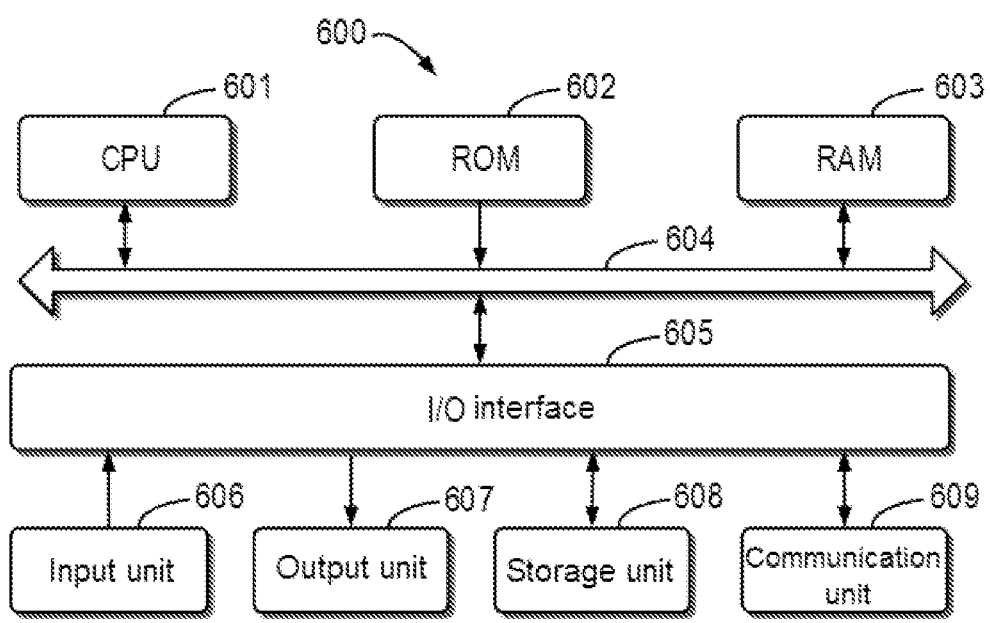
FIG. 6 illustrates a schematic block diagram of an example device that may be used to implement the embodiments of the present disclosure.

FIG. 6 illustrates a schematic block diagram of example device 600 that may be used to implement embodiments of the present disclosure. According to an embodiment of the present disclosure, computing device 110 in FIG. 1 may be implemented by device 600. As shown in the figure, device 600 includes central processing unit (CPU) 601 that may perform various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

The various processes and processing described above, such as methods 200, 300, 400, and 500, may be performed by CPU 601. For example, in some embodiments, methods 200, 300, 400, and 500 may be implemented as a computer software program that is tangibly included in a machine-readable medium such as storage unit 608. In some embodiments, part of or all the computer program may be loaded and/or installed onto device 600 via ROM 602 and/or communication unit 609. When the computer program is loaded into RAM 603 and executed by CPU 601, one or more actions of methods 200, 300, 400, and 500 described above may be executed.

Illustrative embodiments of the present disclosure may relate to a method, a device, a system, and/or a computer program product. The computer program product may include a computer-readable storage medium on which computer-readable program instructions for performing various aspects of the embodiments of the present disclosure are loaded.

The computer-readable storage medium may be a tangible device that may hold and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the foregoing. More specific examples of the computer-readable storage medium as a non-exhaustive list include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage media used herein are not to be interpreted as transient signals per se, such as radio waves or other freely propagating electromagnetic waves, electromagnetic waves propagating through waveguides or other transmission media, for example, light pulses through fiber optic cables, or electrical signal transmitted via electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for performing the operations of the embodiments of the present disclosure may be assembly instructions, instruction set architecture (ISA) instructions, machine instructions, machine-related instructions, microcode, firmware instructions, state setting data, or source or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer over any kind of networks, including a local area network (LAN) or a wide area network (WAN), or may be connected to an external computer, for example, through the Internet by using an Internet service provider. In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the embodiments of the present disclosure.

Various aspects of the embodiments of the present disclosure are described here with reference to the flow charts and/or block diagrams of the method, the device/system, and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

Example embodiments of the present disclosure have been described above. The above description is illustrative, rather than exhaustive, and is not limited to the disclosed various embodiments. Numerous modifications and alterations will be apparent to those of ordinary skill in the art without departing from the scope and spirit of the illustrated embodiments. The selection of terms as used herein is intended to best explain the principles and practical applications of the various embodiments or technical improvements to technologies on the market, so as to enable persons of ordinary skill in the art to understand the embodiments disclosed herein.

What is claimed is:

1. A method, comprising:
  receiving a data read request in at least one of a plurality of routers of a named data network, the data read request comprising a data identifier associated with target data, the data read request being implemented as at least a portion of an interest packet of the named data network;
  determining a storage device of the target data based on the data identifier; and
  acquiring the target data from the storage device based on the data identifier;
  wherein first and second ones of the plurality of routers comprise respective first and second programmable switches configured to support establishment of a secure network connection between the first and second routers operating as respective first and second gateways of the named data network;

the first and second gateways comprising respective named network gateways of the named data network;

each of the first and second named network gateways implementing encryption and decryption functionality via its corresponding one of the first and second programmable switches to support establishment of additional secure network connections with respective edge IoT devices outside of the named data network in order to allow the edge IoT devices to securely access the named data network through corresponding ones of the first and second named network gateways.

2. The method according to claim 1, wherein the data identifier associated with target data comprises a hash value associated with the target data.

3. The method according to claim 1, wherein acquiring the target data comprises:
sending the data read request to a remote computing device if it is determined that the storage device is associated with the remote computing device; and
receiving the target data from the remote computing device.

4. A method, comprising:
receiving a data storage request, the data storage request comprising a data identifier associated with data to be stored;
determining, based on the data identifier, a target storage device for the data to be stored; and
storing, based on the data identifier, the data to be stored to the target storage device;
wherein storing the data to be stored comprises:
sending the data storage request to a remote computing device if it is determined that the target storage device is associated with the remote computing device;
receiving from the remote computing device a data read request for the data to be stored, the data read request comprising the data identifier; and
sending the data to be stored to the remote computing device in response to the data read request.

5. The method according to claim 4, wherein the data identifier associated with data to be stored comprises a hash value associated with the data to be stored.

6. The method according to claim 4, further comprising:
receiving a storage success indication from the remote computing device.

7. The method according to claim 4, wherein the data storage request is implemented as at least a portion of an interest packet of a named data network.

8. An electronic device, comprising:
at least one processing unit; and
at least one memory coupled to the at least one processing unit and storing instructions for execution by the at least one processing unit, wherein the instructions, when executed by the at least one processing unit, cause the electronic device to perform actions comprising:
receiving a data read request in at least one of a plurality of routers of a named data network, the data read request comprising a data identifier associated with target data, the data read request being implemented as at least a portion of an interest packet of the named data network;
determining a storage device of the target data based on the data identifier; and
acquiring the target data from the storage device based on the data identifier;
wherein first and second ones of the plurality of routers comprise respective first and second programmable switches configured to support establishment of a secure network connection between the first and second routers operating as respective first and second gateways of the named data network;
the first and second gateways comprising respective named network gateways of the named data network;
each of the first and second named network gateways implementing encryption and decryption functionality via its corresponding one of the first and second programmable switches to support establishment of additional secure network connections with respective edge IoT devices outside of the named data network in order to allow the edge IoT devices to securely access the named data network through corresponding ones of the first and second named network gateways.

9. The electronic device according to claim 8, wherein the data identifier associated with target data comprises a hash value associated with the target data.

10. The electronic device according to claim 8, wherein acquiring the target data comprises:
sending the data read request to a remote computing device if it is determined that the storage device is associated with the remote computing device; and
receiving the target data from the remote computing device.

11. An electronic device, comprising:
at least one processing unit; and
at least one memory coupled to the at least one processing unit and storing instructions for execution by the at least one processing unit, wherein the instructions, when executed by the at least one processing unit, cause the electronic device to perform actions comprising:
receiving a data storage request, the data storage request comprising a data identifier associated with data to be stored;
determining, based on the data identifier, a target storage device for the data to be stored; and
storing, based on the data identifier, the data to be stored to the target storage device;
wherein storing the data to be stored comprises:
sending the data storage request to a remote computing device if it is determined that the target storage device is associated with the remote computing device;
receiving from the remote computing device a data read request for the data to be stored, the data read request comprising the data identifier; and
sending the data to be stored to the remote computing device in response to the data read request.

12. The electronic device according to claim 11, wherein the data identifier associated with data to be stored comprises a hash value associated with the data to be stored.

13. The electronic device according to claim 11, wherein the actions further comprise:
receiving a storage success indication from the remote computing device.

14. The electronic device according to claim 11, wherein the data storage request is implemented as at least a portion of an interest packet of a named data network.

15. A computer program product that is tangibly stored on a non-transitory computer-readable medium and includes machine-executable instructions, wherein the machine-executable instructions, when executed, cause a machine to perform a data read method, the data read method comprising:
receiving a data read request in at least one of a plurality of routers of a named data network, the data read request comprising a data identifier associated with target data, the data read request being implemented as at least a portion of an interest packet of the named data network;

determining a storage device of the target data based on the data identifier; and acquiring the target data from the storage device based on the data identifier;

wherein first and second ones of the plurality of routers comprise respective first and second programmable switches configured to support establishment of a secure network connection between the first and second routers operating as respective first and second gateways of the named data networks;

the first and second gateways comprising respective named network gateways of the named data network;

each of the first and second named network gateways implementing encryption and decryption functionality via its corresponding one of the first and second programmable switches to support establishment of additional secure network connections with respective edge IoT devices outside of the named data network in order to allow the edge IoT devices to securely access the named data network through corresponding ones of the first and second named network gateways.

16. The computer program product according to claim 15, wherein the data identifier associated with target data comprises a hash value associated with the target data.

17. The computer program product according to claim 15, wherein acquiring the target data comprises:

sending the data read request to a remote computing device if it is determined that the storage device is associated with the remote computing device; and receiving the target data from the remote computing device.

18. The computer program product according to claim 15, wherein the machine-executable instructions, when executed, further cause the machine to perform a data storage method, the data storage method comprising:

receiving a data storage request, the data storage request comprising a data identifier associated with data to be stored;

determining, based on the data identifier, a target storage device for the data to be stored; and storing, based on the data identifier, the data to be stored to the target storage device.

19. The computer program product according to claim 18, wherein the data identifier associated with data to be stored comprises a hash value associated with the data to be stored.

20. The computer program product according to claim 18, wherein storing the data to be stored comprises:

sending the data storage request to a remote computing device if it is determined that the target storage device is associated with the remote computing device;

receiving from the remote computing device a data read request for the data to be stored, the data read request comprising the data identifier; and sending the data to be stored to the remote computing device in response to the data read request.

* * * * *